(12) United States Patent
Wallner

(10) Patent No.: US 9,361,613 B2
(45) Date of Patent: Jun. 7, 2016

(54) SYSTEM AND METHOD FOR A BASEBAND NEARFIELD MAGNETIC STRIPE DATA TRANSMITTER

(71) Applicant: LoopPay, Inc., Burlington, MA (US)

(72) Inventor: George Wallner, Miami Beach, FL (US)

(73) Assignee: Samsung Pay, Inc., Burlington, MA (US)

( * ) Notice: Subject to any disclaimer, the term of this patent is extended or adjusted under 35 U.S.C. 154(b) by 0 days.

(21) Appl. No.: 14/329,130

(22) Filed: Jul. 11, 2014

(65) Prior Publication Data

US 2015/0235204 A1 Aug. 20, 2015

Related U.S. Application Data

(63) Continuation-in-part of application No. 14/181,947, filed on Feb. 17, 2014, now Pat. No. 8,814,046.

(51) Int. Cl.
*G06Q 20/32* (2012.01)
*G06K 19/06* (2006.01)
*G06Q 20/36* (2012.01)

(52) U.S. Cl.
CPC ...... *G06Q 20/3278* (2013.01); *G06K 19/06206* (2013.01); *G06Q 20/322* (2013.01); *G06Q 20/36* (2013.01)

(58) Field of Classification Search
CPC . G06Q 20/3278; G06Q 20/322; G06Q 20/36; G06K 19/06206
See application file for complete search history.

(56) References Cited

U.S. PATENT DOCUMENTS

| 6,206,293 B1 | 3/2001 | Gutman et al. | |
|---|---|---|---|
| 7,114,652 B2 | 10/2006 | Moullette et al. | |
| 8,814,046 B1 * | 8/2014 | Wallner | G06K 7/08 235/380 |
| 2012/0290449 A1 * | 11/2012 | Mullen | G06Q 10/00 705/27.2 |
| 2013/0256397 A1 | 10/2013 | Brown et al. | |

* cited by examiner

*Primary Examiner* — Kristy A Haupt
(74) *Attorney, Agent, or Firm* — Seyfarth Shaw LLP; Brian Michaelis

(57) ABSTRACT

A system for a baseband near field magnetic stripe data transmitter includes a mobile phone, a magnetic stripe transmission (MST) device and a payment button. The mobile phone includes a payment wallet application and is configured to transmit a stream of pulses including magnetic stripe data of a payment card. The MST device includes a driver and an inductor, and the MST device is configured to receive the stream of pulses from the mobile phone, to amplify and shape the received stream of pulses and to generate and emit high energy magnetic pulses including the magnetic stripe data of the payment card. The inductor is driven by a series of timed current pulses that result in a series of high energy magnetic pulses that resemble the fluctuating magnetic field created by a moving magnetic stripe. The payment button is programmed to be associated with a pre-selected payment card and activating of the payment button initiates the emission of high energy magnetic pulses including the magnetic stripe data of the pre-selected payment card.

13 Claims, 4 Drawing Sheets

SYSTEM AND METHOD FOR A BASEBAND NEARFIELD MAGNETIC STRIPE DATA TRANSMITTER

CROSS REFERENCE TO RELATED CO-PENDING APPLICATIONS

This application is a continuation-in-part and claims the benefit of U.S. application Ser. No. 14/181,947 filed on Feb. 17, 2014 and entitled SYSTEM AND METHOD FOR A BASEBAND NEARFIELD MAGNETIC STRIPE DATA TRANSMITTER, which is commonly assigned and the contents of which are expressly incorporated herein by reference.

FIELD OF THE INVENTION

The present invention relates to a system and a method for a baseband nearfield magnetic stripe data transmitter and in particular to a magnetic stripe data transmitter that transmits payment card data from a smartphone, or other electronic device, into a Point of Sale transaction terminal by pressing a payment button on the smartphone or on the magnetic stripe data transmitter.

BACKGROUND OF THE INVENTION

Magnetic stripe payment cards carry a magnetic stripe that contains the payment card data. Magnetic stripe payment cards include credit, debit, gift, and coupon cards, among others. The data is "written" onto the magnetic stripe by alternating the orientation of the magnetic particles embedded into the stripe. Card data is read from the magnetic stripe at a Point of Sale (POS) by swiping the card through a magnetic stripe reader. The reader includes of a reader head and its associated decoding circuitry. When the card is swiped through the reader the magnetic stripe moves in front of the reader head. The moving magnetic stripe, which contains the alternating polarity magnetic domains, creates a fluctuating magnetic field within the narrow sensing aperture of the reader head. The reader head converts this fluctuating magnetic field into an equivalent electrical signal. The decoding circuitry amplifies and digitizes this electrical signal, recreating the same data stream that was originally written onto the magnetic stripe. The encoding of the magnetic stripe is described in the international standard ISO 7811 and 7813.

With the increased popularity and capability of smartphones, there is a growing desire to use them as mobile wallets and to use them to make payments at the point of sale. The key impediment to adoption has been the lack of data transfer channel between mobile phones and the point of sale terminal. A number of alternatives have been proposed. These include the manual keying of data displayed on the phone's screen into POS terminal, 2D barcodes displayed on the phone's screen and read by a 2D barcode reader, RF ID tags attached to phones and built-in Near Field Communications (NFC) hardware driven by an application in the phone. Of these methods, 2D barcodes and NFC are the most promising. Their wide scale adoption, however, is prevented by a lack of suitable reading devices at the point of sale, and in the case of NFC, also the lack of standardized NFC capability in many smartphones.

Accordingly, there is a need for improved devices and methods for transmitting payment card data, or other information, from a smartphone, or other electronic device, remotely into a Point of Sale transaction terminal.

SUMMARY OF THE INVENTION

The present invention describes a system and a method for a baseband near-field magnetic stripe data transmitter that transmits payment card data, or other information, from a smartphone, or other electronic device, remotely into a Point of Sale transaction terminal by pressing a payment button on the smartphone or on the magnetic stripe data transmitter.

In general, one aspect the invention provides a system for a baseband near field magnetic stripe data transmitter including a mobile phone, a magnetic stripe transmission (MST) device and a payment button. The mobile phone includes a payment wallet application and is configured to transmit a stream of pulses comprising magnetic stripe data of a payment card. The magnetic stripe transmission (MST) device includes a driver and an inductor, and the MST device is configured to receive the stream of pulses from the mobile phone, to amplify and shape the received stream of pulses and to generate and emit high energy magnetic pulses comprising the magnetic stripe data of the payment card. The inductor is driven by a series of timed current pulses that result in a series of high energy magnetic pulses that resemble the fluctuating magnetic field created by a moving magnetic stripe. The payment button is programmed to be associated with a pre-selected payment card and activating of the payment button initiates the emission of high energy magnetic pulses comprising the magnetic stripe data of the pre-selected payment card.

Implementations of this aspect of the invention include the following. The payment button is located in the MST device, or in the mobile phone. The mobile phone is configured to receive a notification signal when the payment button is activated. The payment button is configured to be activated remotely via a wireless connection. The transmitted card data may be retrieved from either a memory of the mobile phone or a memory contained in the MST device. The emitted high energy magnetic pulses are configured to be picked up remotely by a magnetic read head. The MST device shapes the received stream of pulses to compensate for shielding, eddy current losses and limited inductance value of the magnetic read head. The magnetic read head includes a magnetic read head inductor and the inductor of the MST is configured to form a loosely coupled transformer with the magnetic read head inductor from a distance longer than 0.5 inches. The inductor of the MST includes an iron or ferrite core and the core is designed not to saturate under a high current flowing through the inductor.

In general, in another aspect the invention provides a system for a baseband near field magnetic stripe data transmitter including a mobile phone, a magnetic stripe transmission (MST) device and a. payment button. The mobile phone is configured to transmit a stream of pulses comprising magnetic stripe data of a payment card. The magnetic stripe transmission (MST) device includes a driver and an inductor, and the MST device is configured to receive the stream of pulses from the mobile phone, to amplify and shape the received stream of pulses and to generate and emit high energy magnetic pulses comprising the magnetic stripe data of the payment card. The emitted high energy magnetic pulses are configured to be picked up remotely by a magnetic read head. The inductor includes one or more windings, and the one or more windings are configured to generate magnetic flux lines that are spread over a large enough area dimensioned to include a sensing aperture of the magnetic read head and to generate an inductance value that is configured to cause properly timed current pulses to reach their maximum value and thereby to cause maximum induced voltage in the magnetic read head. The payment button is programmed to be associated with a pre-selected payment card and activating of the payment button initiates the emission of high energy magnetic pulses comprising the magnetic stripe data of the pre-selected payment card.

In general, in another aspect the invention provides a magnetic stripe transmission (MST) device including a driver, an inductor and a payment button. The MST device is configured to receive a stream of pulses comprising magnetic stripe data of a payment card, to shape and amplify the received stream of pulses and to generate and emit high energy magnetic pulses comprising the magnetic stripe data of the payment card. The emitted high energy magnetic pulses are configured to be picked up remotely by a magnetic read head. The payment button is programmed to be associated with a pre-selected payment card. Activating the payment button causes the MST device to receive a stream of pulses comprising magnetic stripe data of the pre-selected payment card, to shape and amplify the received stream of pulses and to generate and emit high energy magnetic pulses comprising the magnetic stripe data of the pre-selected payment card. The magnetic stripe data of the pre-selected payment card are stored in a memory of the MST or a memory of a mobile phone.

BRIEF DESCRIPTION OF THE DRAWINGS

Referring to the figures, wherein like numerals represent like parts throughout the several views.

DETAILED DESCRIPTION OF THE INVENTION

The present invention describes a system and a method for a baseband near field magnetic stripe data transmitter that transmits payment card data from a smartphone, or other electronic device, into a Point of Sale transaction terminal by pressing a payment button on the smartphone or on the magnetic stripe data transmitter.

Baseband Near Field Magnetic Stripe Transmission (MST), the subject of this invention, uses a pulse modulated magnetic field to transmit from a distance data from a smartphone into a POS terminal. The system is able to transmit card data into the POS terminal's reader without it being in contact with, or in close proximity to (less then 1 mm), the reader head, or without the need to be inserted into the card reader slot. Furthermore, the system eliminates the need for the swiping motion required with magnetic stripe cards or prior-art magnetic stripe emulation or electronic magnetic stripes, as described by Narenda et al, in U.S. Pat. No. 7,954,716.

The magnetic field is generated by a specially designed inductor, driven by a high power driver circuit. The inductor's unique structure results in a complex omni-directional magnetic field that, from a distance, is able to penetrate the magnetic stripe reader head located in the POS terminal.

Figure 2:
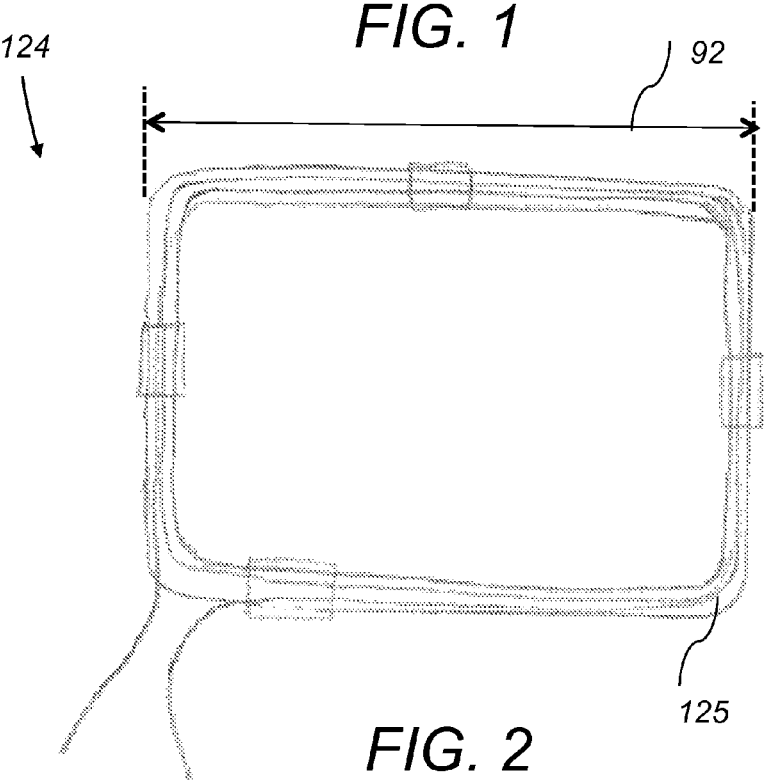
FIG. 2 is a schematic diagram of a typical inductor used to generate the required magnetic field, according to this invention.

Referring to FIG. 2, inductor 124 includes one or more rectangular wire bundle(s) 125 of approximately 40×30 mm outside dimensions with a 3 mm bundle thickness. Inductor 124 has an inductance of such a value that properly timed current pulses reach their maximum value at the end of each pulse. Also, the ratio of inductance and winding resistance values is critical in shaping the current from the driver circuit to result in a magnetic field that closely resembles the magnetic signal seen by the magnetic reader head when a magnetic stripe card is swiped in front of it. In one example, the ratio of inductance to winding resistance is 80 µH/Ohm.

The physical shape of the inductor ensures that the magnetic flux lines are spread over a large enough area to include the sensing aperture of the reader head. The inductor windings may be enamel insulated magnet wire, or alternatively, the inductor my be implemented as a spiral inductor formed by conductor traces laid out on rigid or flexible printed circuit substrates.

Although the inductor is stationary, the inductor is driven by a series of timed current pulses that result in a series of magnetic pulses that resemble the fluctuating magnetic field created by a moving magnetic stripe. The modulation of the field follows the standard magnetic stripe encoding, which in turn results in a stream of electrical pulses on the reader's output that is identical to what would be obtained from a magnetic stripe.

The key benefit of MST is that it works with the existing infrastructure of point of sale card payment terminals. Unlike with NFC or 2D barcode, no external reader or new terminal has to be installed.

Figure 1:
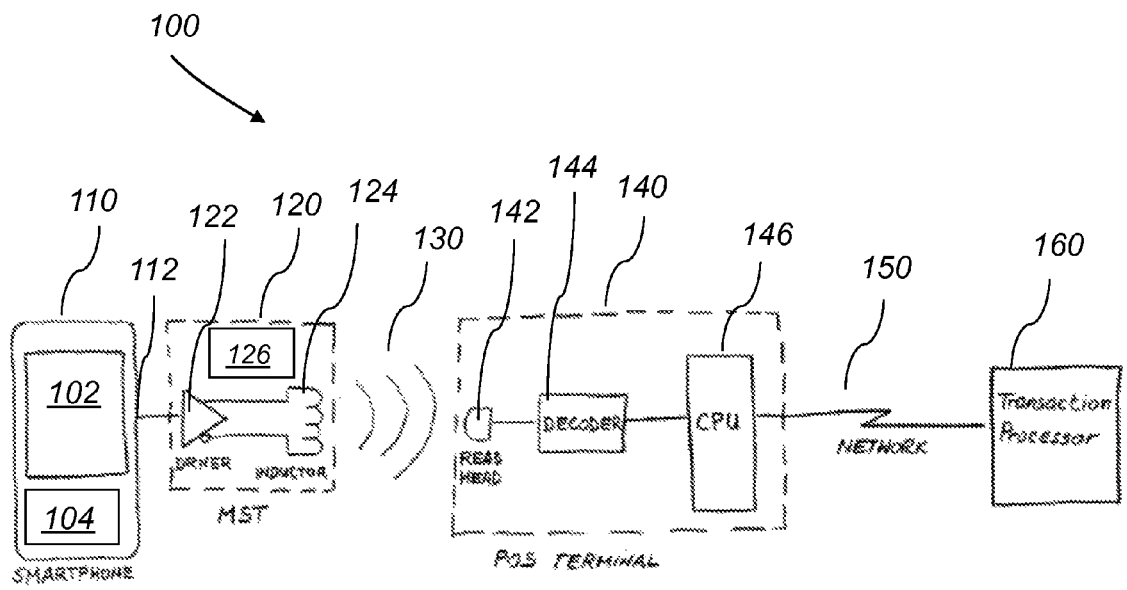
FIG. 1 is an overview diagram of the baseband near-field magnetic stripe data transmitter system, according to this invention.

Referring to FIG. 1, in one embodiment of this invention 100, a suitable driver 122 and inductor 124 are contained in a small capsule 120, which is connected to the audio jack 112 of the phone 110. Smartphone 110 is loaded with a wallet software application 102. The phone 110 is connected to the Magstripe Transmitter 120 via its audio jack 112. To make a payment at a point of sale location equipped with a common card payment terminal capable of reading standard ISO/ABA magnetic stripe cards 140 the consumer selects the wallet application 102 on his smartphone 110 and selects one of the pre-loaded payment cards (i.e., Visa, Mastercard, Amex) he wants to use for the payment. He holds the phone close (1 to 2 inches) to the point of sale terminal 140 and presses the pay icon/key 104 on the phone 110. The wallet application 102 in the phone 110 sends to the MST 120 via the audio jack 112 a stream of pulses that contain the selected card's magnetic stripe data. The MST 120 amplifies, shapes and emits the pulses in the form of suitably modulated high energy magnetic impulses 130. The magnetic impulses 130 are picked up by the magstripe reader head 142 located in the point of sale payment terminal 140 and are converted into electrical pulses. The resulting electrical pulses are decoded by decoder 144 and processed by its central processing unit (CPU) 146, just like it would process a standard magnetic stripe card that was swiped through its reader slot. The merchant enters the payment amount and the transaction is sent by the POS terminal 140 via the network 150 to the payment transaction processor 160. The transaction processor 160 returns the transaction authorization and the POS terminal 140 prints a receipt. With the exception of the card entry method, the entire transaction is completed in the same manner as with a standard magnetic stripe card.

In another embodiment of MST 120, security is improved by the smartphone supplementing the transaction transmitted through the payment terminal with a separate secure wireless message sent to the processor, where the two transactions are combined for the purposes of authentication.

Figure 3:
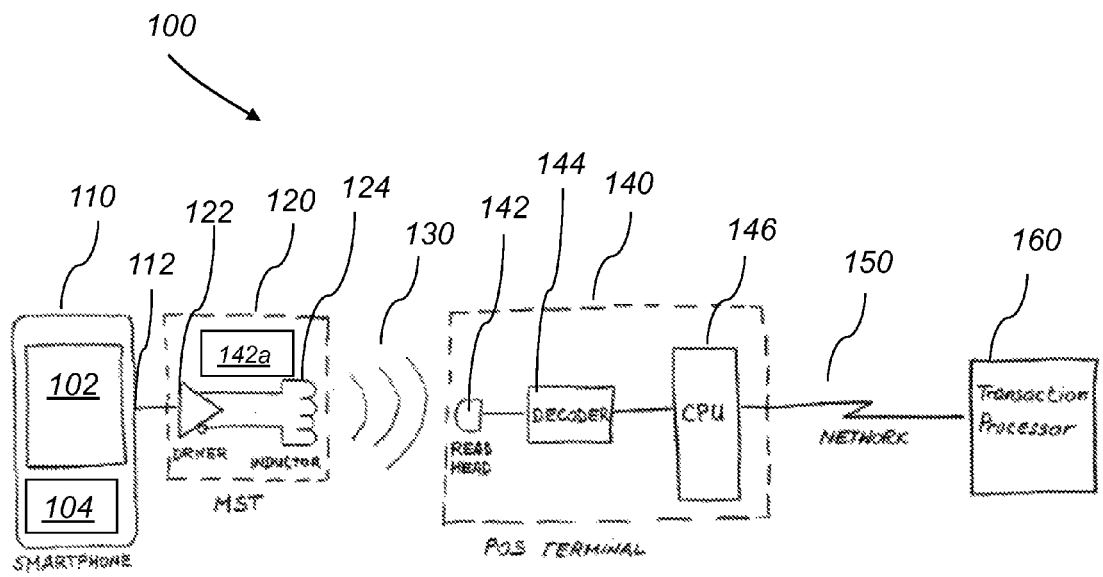
FIG. 3 is an overview diagram of another embodiment of the baseband near-field magnetic stripe data transmitter system, according to this invention.

Referring to FIG. 3, in another embodiment, the MST 120 is integrated with a magnetic stripe reader (MSR) head 142a, creating a single device able to both read and transmit magnetic stripe information. The combination of the MST and MSR in conjunction with an electronic wallet 102, provides a convenient and secure means of loading payment cards into an electronic wallet and the subsequent transmission of the payment card data to a POS system 140. Furthermore, this embodiment allows convenient person to person payments using credit or debit cards, where each person is equipped with an MST and is able to transmit his card information into the other persons mobile phone with the card reader included in that person's MST.

In another embodiment, magnetic stripe transmission is used to transmit tokenized card data to the point of sale terminal. In this embodiment, the actual payment card number or part of it is substituted by a cryptographically generated token, which is formatted as track data, including token data formatted to resemble a standard Primary Account Number (PAN). The PAN may contain a valid Bank Identification Number (BIN). Such token is either downloaded from the card issuer, another online source, or is locally generated. The MST transmission of tokens replaces the transmission of valid card numbers by transmitting cryptographically generated tokens that are valid only for one transaction and thus eliminates the security risk inherent in the standard magnetic stripe, all without the need to change the existing point of sale hardware. In other embodiments, more than one track data are transmitted in order to increase compatibility with existing point of sale hardware and software. In these embodiments, the transmission of Track 1 data may be followed by the transmission of Track 2 data, or Track 2 data may be followed by Track 1 data.

In a further embodiment, the MST 120 also contains a secure microcontroller 126 which provides secure local storage of the card data and directly drives the inductor driver circuit 122. This embodiment allows the MST to operate detached from the phone in a store-and-transmit mode. In some embodiments, the MST further includes volatile and non-volatile memory for the secure storage of card data and other personal information.

Yet another possible implementation uses BlueTooth™ communications between the phone 110 and the MST 120, where two-way communications is used for enhanced security and flexibility, including the retrieval by the phone of card data stored in the secure element formed by the MST's secure microcontroller 126.

In yet another possible implementation the MST 120 uses its built-in secure microcontroller 126 to encrypt, either partially or fully, the card data and transmits it via the magnetic field to the point of sale card reader.

In yet another possible implementation the payment card data comprise card verification value (CVV) data that are changed dynamically. In this case, the security of a transaction is improved due to the dynamic changing of the CVV data.

Figure 4:
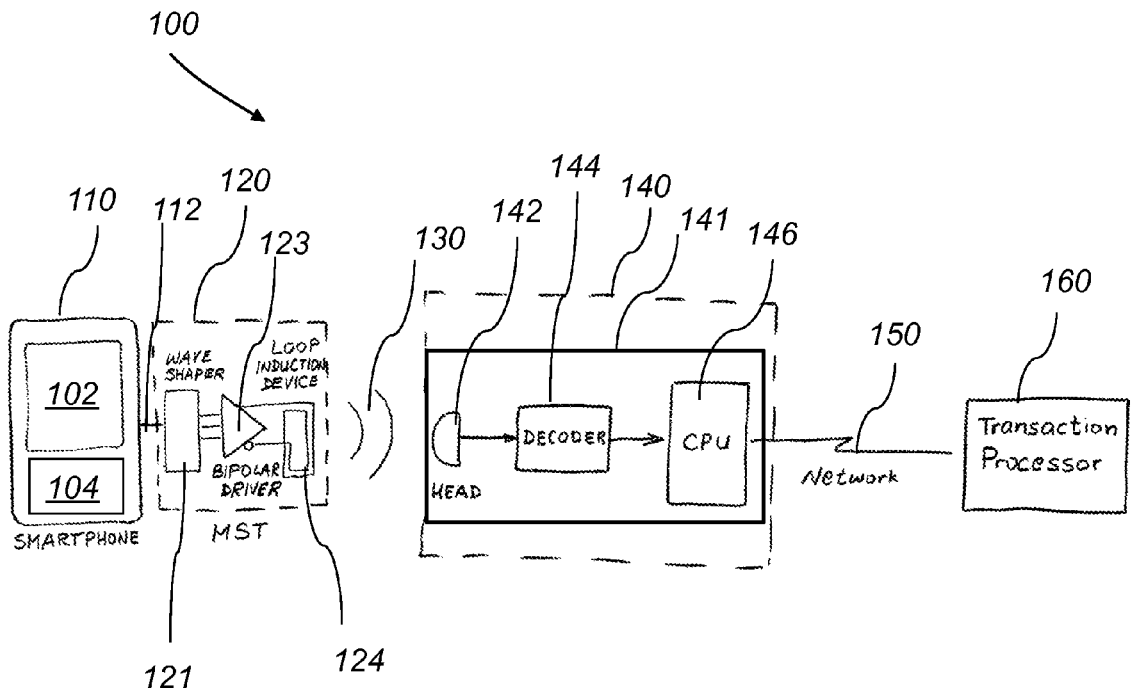
FIG. 4 is an overview diagram of another embodiment of the baseband near-field magnetic stripe data transmitter system, according to this invention.

Referring to FIG. 4, in another embodiment of this invention 100, Magstripe Transmitter (MST) 120 includes a wave shaper 121, a bipolar driver 123 and a loop inductor 124. Smartphone 110 is loaded with a wallet software application 102, and is connected to the Magstripe Transmitter 120 via its audio jack 112. To make a payment at a point of sale location equipped with a common card payment terminal capable of reading standard ISO/ABA magnetic stripe cards 140, the consumer selects the wallet application 102 on his smartphone 110 and selects one of the pre-loaded payment cards (i.e., Visa, Mastercard, Amex) he wants to use for the payment. He holds the phone close (1 to 2 inches) to the point of sale terminal 140 and presses the pay icon/key 104 on the phone 110. The wallet application 102 in the phone 110 sends to the MST 120 via the audio jack 112 a stream of pulses that contain the selected card's magnetic stripe data. The MST 120 amplifies, shapes and emits the pulses in the form of suitably modulated high energy magnetic impulses 130. The magnetic impulses 130 are picked up by the magstripe reader head 142 located in the point of sale payment terminal 140 and are converted into electrical pulses. The resulting electrical pulses are decoded by decoder 144 and processed by its central processing unit (CPU) 146, just like it would process a standard magnetic stripe card that was swiped through its reader slot. The merchant enters the payment amount and the transaction is sent by the POS terminal 140 via the network 150 to the payment transaction processor 160. The transaction processor 160 returns the transaction authorization and the POS terminal 140 prints a receipt. With the exception of the card entry method, the entire transaction is completed in the same manner as with a standard magnetic stripe card.

The magnetic stripe reader-heads used in point of sale terminals are designed to be sensitive only to magnetic fields that originate close to and within their sensing aperture, which is located right in front of the head. They are designed to ignore external magnetic fields outside this sensing aperture. The intended pick-up distance is a fraction of an inch and the field of sensitivity is only a few degrees wide. Additionally, reader heads are surrounded by a metal shield 141 that greatly attenuates changing magnetic fields outside the head's intended sensing aperture, shown in FIG. 4. Further, the shield 141 is connected to the terminal's frame ground, which shunts to ground coupled common mode signals originating externally. These design features are aimed at ensuring that the head does not pick up noise from nearby electrical equipment, transmitters or cell-phones. These same design features also prevent remote induction of card data when using an ordinary inductor and pulses that resemble those generated by a moving magnetic stripe.

Figure 5:
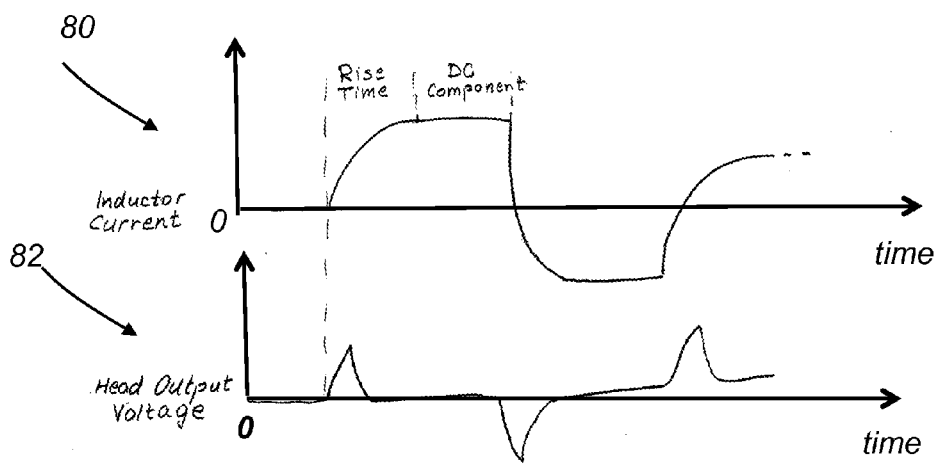
FIG. 5 is a graphical representation of the inductor current versus time and the magnetic reader head output voltage versus time, for the embodiment of FIG. 4.

Accordingly, penetrating the shielding 141 of the reader-head from a distance longer than 0.5 inches, and from most angles, requires special techniques, which are the subject of this invention. These techniques assure that the signal reaching the head's internal inductor is free of distortion and have the right shape and timings. In order to meet these requirements, the MST 120 pre-shapes the waves with the wave shaper 121 to compensate for the effects of the shielding, eddy currents and the limited inductance of the reader head 142. Referring to FIG. 5, a large DC component 81 is added to the inductor current 80 to compensate for the rapidly collapsing magnetic fields inside the head's 142 shielded enclosure 141 and the effects of the relatively low inductance of the reader-head winding. Additionally, the reader-head amplifier has limited bandwidth. To achieve sufficient induced signal amplitudes, the pulse rise times 82 is controlled to be between 10 and 60 microseconds. This ensures that that the pulse rise times fall within the bandwidth of the reader-head amplifier but not outside the timing constraints of the decoder circuit.

Furthermore, in order to achieve the required penetration from a distance larger than 0.5 inches, a suitable driver 123 must deliver magnetic pulses having a large enough current, that exceeds 1 Ampere peak. Additionally, to create the right output on the reader-head, the current must be bipolar and must contain a large DC component, which is in excess of 40% of the peak current.

The inductive device 124 of the MST is specially designed to form a loosely coupled transformer, from a distance longer than 0.5 inches, with the card reader-head 142, where the MST's inductor 124 is the primary and the reader-head's inductor is the secondary. Because the coupling between this primary and secondary is very lose, and because of the high losses caused by the head's shielding 141, as well as the losses caused by eddy currents, the current driving the inductor must be of a special level and shape. The magnetic field thus generated must be of a sufficient intensity that these losses are compensated for and sufficient signal is induced into the reader head's inductor.

Figure 6:
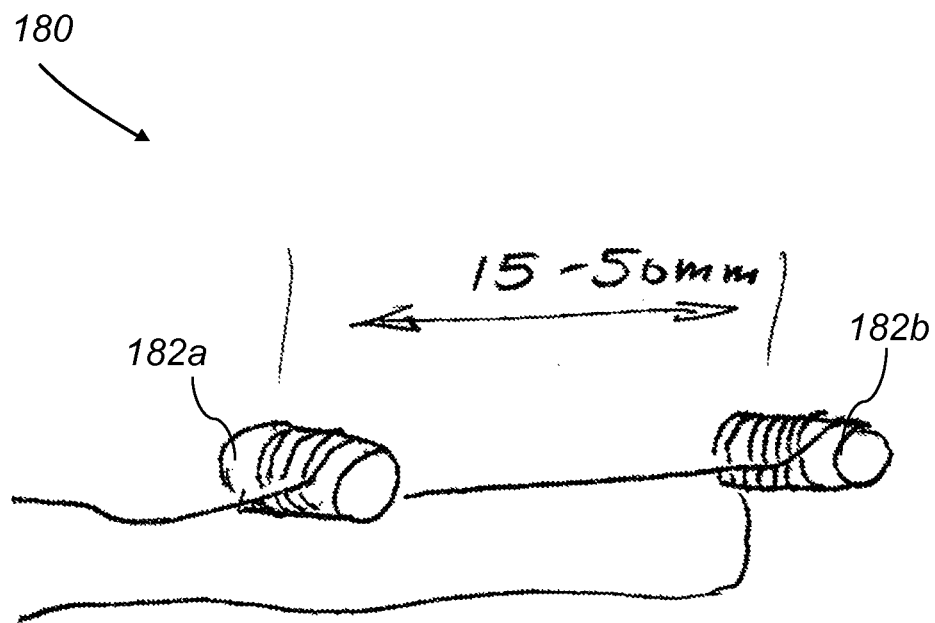
FIG. 6 depicts an array of two inductors.
Figure 7:
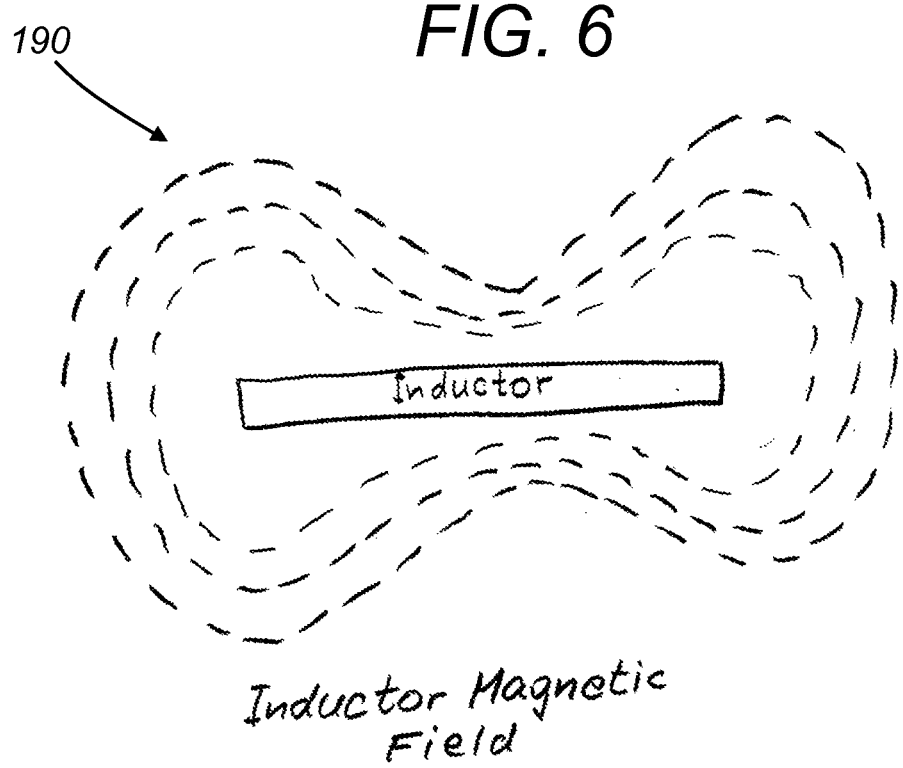
FIG. 7 depicts the inductor magnetic field.

Therefore inductor 124 is designed to have a very specific set of characteristics to make it suitable for the transmission function. It has low enough winding resistance to allow the large current needed to generate the intense magnetic field. At the same time, it has sufficient inductance to control the rise time of the current pulses. The inductance required mandates a large number of turns (over 20), without increasing the winding resistance beyond 3 ohms. Concurrent with that, the inductor is shaped to provide a sufficiently well distributed magnetic field with few nulls, as shown in FIG. 7. Such an inductor is either a single inductor that encloses a large area (between 600 and 1700 square mm), shown in FIG. 2, or an array 180 of spatially distributed two or more inductors 182a, 182b covering the same area, shown in FIG. 6. The inductor (or inductors) may have either, iron or ferrite core(s), which is designed such as to not saturate under the high current driven through the inductor(s). In one example, the inductor 124 has a length 92 in the range between 15 mm to 50 mm. In another example, the MST 120 includes an array 180 of two inductors 182a, 182b separated by a distance in the range of 15 mm to 50 mm.

The traditional magnetic stripe data format does not contain features that protect it against copying. While the MST transmits the card data in a magnetic stripe format, the actual data transmitted does not have to be identical to the data contained in the magnetic stripe of the physical card.

The MST invention includes a secure transmission option where the card data is suitably modified by replacing part of the discretionary data field with a cryptographically generated dynamic element. This security data element, generated either in the phone or in the hardware of the MST, contains a secure hash which is generated using the card data, the MST ID and a sequence number that is incremented for each transmission, and encrypted by a Key supplied by either the card issuer of another third party. The issuer of the Key is able to calculate this secure hash, using the Key, and thus able to verify that a transaction has originated from a legitimate device using legitimate card data. Because the secure hash changes with every transaction in an unpredictable way, a fraudster (who does not know the Key) can not calculate a valid hash for a new transaction. As each transaction contains a sequence number, the recipient is able to identify a replay. Also, because the secure hash replaces a crucial part of the original discretionary data field, data captured from an MST transaction is unsuitable for creating a valid counterfeit card.

By modifying only the part of the card data which is not used by the retailer and the acquirer, this scheme preserves compatibility with existing retail POS and acquirer processing system.

Figure 8:
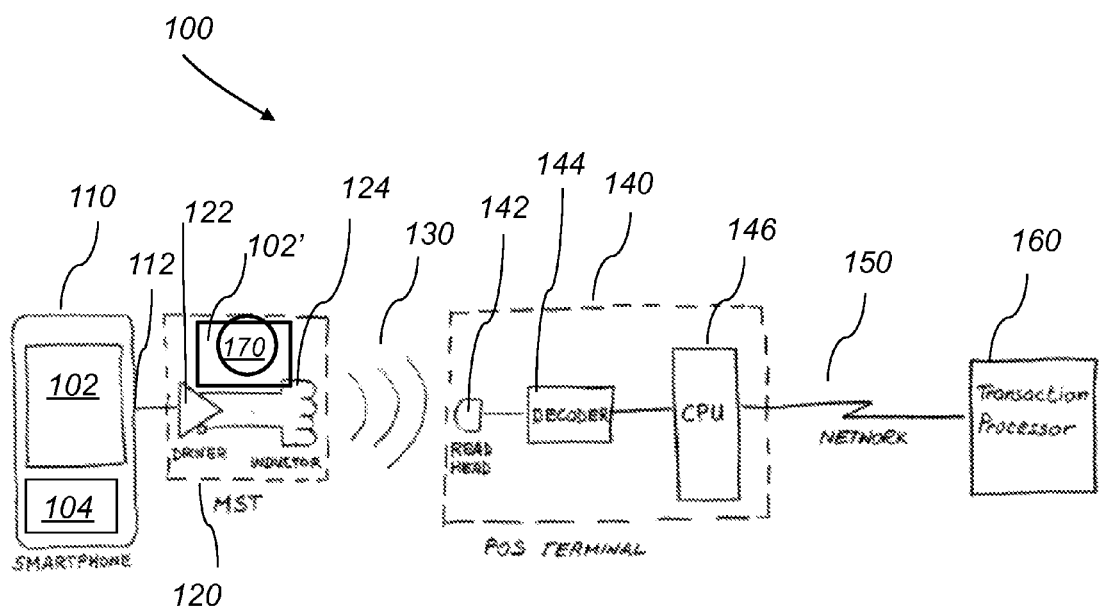
FIG. 8 is an overview diagram of another embodiment of the baseband near-field magnetic stripe data transmitter system, according to this invention.

Referring to FIG. 8, in another embodiment of this invention 100, Magstripe Transmitter (MST) 120 further includes a payment button ("Button Pay") 170. Button Pay 170 is programmed to be associated with a specific pre-selected payment card that is stored in an electronic wallet. The electronic wallet 102 or 102' may be located in the mobile phone 110 or the MST 120, as shown in FIG. 8. Pressing the Button Pay 170 causes the data of the specific pre-selected payment card to be transmitted to the point of sale payment terminal 140. Accordingly, in order to make a payment at a point of sale location equipped with a common card payment terminal capable of reading standard ISO/ABA magnetic stripe cards 140, the consumer presses the Button Pay 170 on the MST 120 and the system automatically selects the pre-programmed and pre-selected specific payment card that is associated with the Button Pay 170 and this causes the mobile phone 110 to send a stream of pulses that contain the pre-selected card's magnetic stripe data to the MST 120. The stream of pulses that contain the pre-selected card's magnetic stripe data are amplified, shaped and emitted by the MST in the form of suitably modulated high energy magnetic impulses 130. The magnetic impulses 130 are picked up by the mag-stripe reader head 142 located in the point of sale payment terminal 140 and are converted into electrical pulses. The resulting electrical pulses are decoded by decoder 144 and processed by its central processing unit (CPU) 146. The merchant enters the payment amount and the transaction is sent by the POS terminal 140 via the network 150 to the payment transaction processor 160. The transaction processor 160 returns the transaction authorization and the POS terminal 140 prints a receipt. Other embodiments include one or more of the following. Key 104 in the mobile phone 110 is programmed to be associated with a specific payment card and functions as a Button Pay. The user is notified by the mobile phone that the Button Pay was activated. The MST device is detached from the mobile phone and the Button Pay is remotely activated via the mobile phone's Bluetooth network.

Button Pay is very convenient to use because the consumer does not need to open the electronic wallet and select a card, or does not need to pull out the physical wallet and a card to present to the cashier. This convenience leads to changes in consumer behavior that could be very important to card issuers. Normally, with a physical or electronic wallet, the consumer has a relatively easy choice of pulling out or selecting one of a number of cards in his wallet, normally based on some "strategy" (Amex for entertainment, Visa for purchases, Visa debit for the groceries, etc.). Button Pay provides very convenient access to one card and therefore that card is used for everything. Button Pay changes the relatively level playing field offered by a conventional or electronic wallet in favor of one particular card. The average time for paying with the Button Pay is 3-4 seconds, whereas the average time for paying with a physical card is 17-22 seconds and the average time for paying with a card stored in an electronic wallet is 14-17 seconds.

Several embodiments of the present invention have been described. Nevertheless, it will be understood that various modifications may be made without departing from the spirit and scope of the invention. Accordingly, other embodiments are within the scope of the following claims.

What is claimed is:

1. A system for a baseband near field magnetic stripe data transmitter comprising:
   a mobile phone comprising a payment wallet application and being configured to transmit a stream of pulses comprising magnetic stripe data of a payment card;
   a magnetic stripe transmission (MST) device comprising a driver and an inductor, wherein the MST device is configured to receive the stream of pulses from the mobile phone, to amplify and shape the received stream of pulses and to generate and emit high energy magnetic pulses comprising the magnetic stripe data of the payment card;

wherein the inductor is driven by a series of timed current pulses that result in a series of high energy magnetic pulses that resemble the fluctuating magnetic field created by a moving magnetic stripe; and a payment button, wherein the payment button is programmed to be associated with a pre-selected payment card and wherein activating of the payment button initiates the emission of high energy magnetic pulses comprising the magnetic stripe data of the pre-selected payment card.

2. The system of claim 1, wherein the payment button is located in the MST device.

3. The system of claim 1, wherein the payment button is located in the mobile phone.

4. The system of claim 1, wherein the mobile phone is configured to receive a notification signal when the payment button is activated.

5. The system of claim 1, wherein the payment button is configured to be activated remotely via a wireless connection.

6. The system of claim 1, wherein the emitted high energy magnetic pulses are configured to be picked up remotely by a magnetic read head.

7. The system of claim 6, wherein the MST device shapes the received stream of pulses to compensate for shielding, eddy current losses and limited inductance value of the magnetic read head.

8. The system of claim 6, wherein the magnetic read head comprises a magnetic read head inductor and wherein the inductor of the MST is configured to form a loosely coupled transformer with the magnetic read head inductor from a distance longer than 0.5 inches.

9. The system of claim 1, wherein the inductor of the MST comprises an iron or ferrite core and wherein said core is designed not to saturate under a high current flowing through the inductor.

10. A system for a baseband near field magnetic stripe data transmitter comprising:

a mobile phone configured to transmit a stream of pulses comprising magnetic stripe data of a payment card;

a magnetic stripe transmission (MST) device comprising a driver and an inductor, wherein the MST device is configured to receive the stream of pulses from the mobile phone, to amplify and shape the received stream of pulses and to generate and emit high energy magnetic pulses comprising the magnetic stripe data of the payment card;

wherein the emitted high energy magnetic pulses are configured to be picked up remotely by a magnetic read head;

wherein the inductor comprises one or more windings, and wherein said one or more windings are configured to generate magnetic flux lines that are spread over a large enough area dimensioned to include a sensing aperture of the magnetic read head and to generate an inductance value that is configured to cause properly timed current pulses to reach their maximum value and thereby to cause maximum induced voltage in the magnetic read head; and a payment button, wherein the payment button is programmed to be associated with a pre-selected payment card and wherein activating of the payment button initiates the emission of high energy magnetic pulses comprising the magnetic stripe data of the pre-selected payment card.

11. A magnetic stripe transmission (MST) device comprising:

a driver;

an inductor;

wherein the MST device is configured to receive a stream of pulses comprising magnetic stripe data of a payment card, to shape and amplify the received stream of pulses and to generate and emit high energy magnetic pulses comprising the magnetic stripe data of the payment card;

wherein the emitted high energy magnetic pulses are configured to be picked up remotely by a magnetic read head;

a payment button programmed to be associated with a pre-selected payment card; and wherein activating the payment button causes the MST device to receive a stream of pulses comprising magnetic stripe data of the pre-selected payment card, to shape and amplify the received stream of pulses and to generate and emit high energy magnetic pulses comprising the magnetic stripe data of the pre-selected payment card.

12. The MST device of claim 11, wherein the magnetic stripe data of the pre-selected payment card are stored in a memory of the MST.

13. The MST device of claim 11, wherein the magnetic stripe data of the pre-selected payment card are stored in a memory of a mobile phone.

* * * * *